United States Patent
Watanabe et al.

(10) Patent No.: US 7,076,174 B2
(45) Date of Patent: Jul. 11, 2006

(54) METHOD, DEVICE, AND SYSTEM FOR PROCESSING OPTICAL SIGNAL

(75) Inventors: Shigeki Watanabe, Kawasaki (JP); Fumio Futami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 09/814,762

(22) Filed: Mar. 23, 2001

(65) Prior Publication Data

US 2002/0041618 A1   Apr. 11, 2002

(30) Foreign Application Priority Data

Sep. 1, 2000   (JP) ............................. 2000-264757

(51) Int. Cl.
*H04B 10/00* (2006.01)

(52) U.S. Cl. ..................... 398/158; 398/140; 398/141; 398/147; 398/146; 398/148; 398/173; 398/175; 398/179; 398/79; 398/80; 398/81; 398/97; 385/24; 385/37; 385/27; 385/1; 385/38; 385/122; 385/123

(58) Field of Classification Search ................ 398/175, 398/176, 155, 154, 147, 158, 140, 141, 146, 398/148, 173, 79, 80, 81, 97, 179; 359/326, 359/332, 328, 330; 385/122, 123, 27, 24, 385/37, 1, 38

See application file for complete search history.

(56) References Cited

U.S. PATENT DOCUMENTS

| | | | | |
|---|---|---|---|---|
| 6,141,129 A | * | 10/2000 | Mamyshev | ................. 398/180 |
| 6,674,973 B1 | * | 1/2004 | Leclerc et al. | .............. 398/175 |
| 2001/0013965 A1 | * | 8/2001 | Watanabe | ................... 359/161 |
| 2004/0005153 A1 | * | 1/2004 | Watanabe | ................... 398/148 |

OTHER PUBLICATIONS

W.J. Tomlinson, et al., "Compression of Optical Pulses Chirped by Self-Phase Modulation in Fibers", J. Opt. Soc Am. B., vol. 1, No. 2/Apr. 1984, pp. 139-149.

R. H. Stolen, et al., "Self-Phase-Modulation in Silica Optical Fibers", Physical Review A, vol. 17, No. 4, pp. 1448-1453.

(Continued)

*Primary Examiner*—Hanh Phan
(74) *Attorney, Agent, or Firm*—Staas & Halsey LLP

(57) ABSTRACT

The present invention relates to a method for processing an optical signal is provided. An optical signal is input into an optical waveguide structure for providing a nonlinear effect. As a result, the optical signal undergoes chirping induced by the nonlinear effect. An output optical signal output from the optical waveguide structure is supplied to an optical bandpass filter to thereby extract components except a small-chirp component from the output optical signal. The optical bandpass filter has a pass band including a wavelength different from the wavelength of the optical signal. By extracting the components except the small-chirp component from the output optical signal in the form of pulse, it is possible to remove intensity fluctuations or accumulated noise especially at a top portion and/or a low-power portion of the pulse.

15 Claims, 13 Drawing Sheets

OTHER PUBLICATIONS

H.H. Kuehl, "Solitons on an Axially Nonuniform Optical Fiber", J. Opt. Soc. Am. B., vol. 5, No. 3/Mar. 1988, pp. 709-713.

L. F. Mollenauer, et al., "Extreme Picosecond Pulse Narrowing By Means of Soliton Effect in Single-Mode Optical Fibers", Optics Letters, vol. 8, No. 5, May 1983.

* cited by examiner

F I G. 1 0
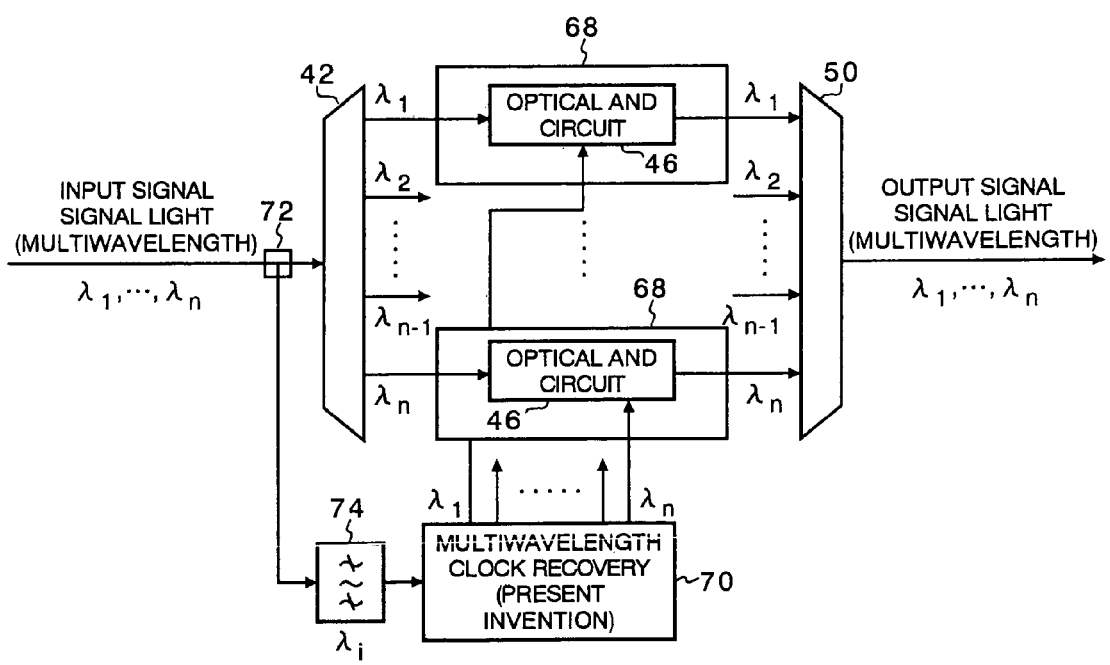

METHOD, DEVICE, AND SYSTEM FOR PROCESSING OPTICAL SIGNAL

CROSS-REFERENCE TO RELATED APPLICATION

This application relates to application Ser. Nos. 09/560,723, 09/571,384, 09/637,640, and 09/665,164, and which are incorporated herein by references.

BACKGROUND OF THE INVENTION

1. Field of the Invention

The present invention relates to a method, device, and system for processing an optical signal.

2. Description of the Related Art

In an optical fiber communication system that has been put to practical use in recent years, a reduction in signal power due to transmission line loss, coupling loss, etc. is compensated by using an optical amplifier such as an erbium doped fiber amplifier (EDFA). The optical amplifier is an analog amplifier, which functions to linearly amplify a signal. In this kind of optical amplifier, amplified spontaneous emission (ASE) noise generated in association with the amplification is added to cause a reduction in signal-to-noise ratio (S/N ratio), so that the number of repeaters is limited to result in the limit of a transmission distance. Further, waveform degradation due to the chromatic dispersion owned by an optical fiber and the nonlinear optical effects in the fiber is another cause of the transmission limit. To break down such a limit, a regenerative repeater for digitally processing a signal is required, and it is desirable to realize such a regenerative repeater. In particular, an all-optical regenerative repeater capable of performing all kinds of signal processing in optical level is important in realizing a transparent operation independent of the bit rate, pulse shape, etc. of a signal.

The functions required for the all-optical regenerative repeater are amplitude restoration or reamplification, timing restoration or retiming, and waveform shaping or reshaping. Attention is paid to these functions in the present invention to provide an all-optical regenerative repeater in an optical communication system or a signal regenerator at any node point in an optical network by using chirp due to a self-phase modulation (SPM) effect exhibited during propagation of an optical pulse in an optical waveguide structure such as an optical fiber.

The most general one of conventional timing recovery circuits for optical signal regenerating devices is an OE type timing recovery circuit so designed as to once convert an input optical signal into an electrical signal by using a photodetector such as a photodiode, next electrically extract a fundamental frequency, and thereafter intensity-modulate laser light by this fundamental frequency. Such an OE type timing recovery circuit is used for a regenerative repeater in a conventional optical communication system. However, the operating speed of the OE type timing recovery circuit is limited by an electronic circuit for signal processing, so that the bit rate of an input signal is fixed to a low rate.

Another type of timing recovery circuit known in the art is such that in an active MLL (mode-locked laser) incorporating an optical modulator such as an LN (lithium niobate) modulator and an EA (electroabsorption) modulator, the optical modulator is modulated by a fundamental frequency electrically regenerated in a manner similar to the above to thereby regenerate a clock pulse.

On the other hand, an all-optical type timing recovery circuit for optically processing an optical signal on all the stages is also known in the art. Examples of this type timing recovery circuit include a Fabry-Perot laser configured by a saturable absorber, a self-pulsation laser configured by a DFB-LD (distributed feedback laser diode) having integrated reflection and phase modulation functioning portions, and an active MLL for applying AM or FM to a nonlinear medium by signal light.

However, in the case of applying the processing of an optical signal by the conventional timing recovery circuit to wavelength division multiplexing (WDM), it is necessary to prepare a plurality of timing recovery circuits whose number corresponds to the number of WDM channels, causing an enlargement in scale of the device.

It is therefore an object of the present invention to provide a novel method, device, and system for processing an optical signal independent of the bit rate, pulse shape, etc. of the optical signal.

It is another object of the present invention to provide a method, device, and system for processing an optical signal suitable for WDM (wavelength division multiplexing).

Other objects of the present invention will become apparent from the following description.

SUMMARY OF THE INVENTION

In accordance with a first aspect of the present invention, there is provided a method for processing an optical signal. In this method, an optical signal is input to an optical waveguide structure for providing a nonlinear effect. As a result, the optical signal undergoes chirping induced by the nonlinear effect. Then, an output optical signal output from the optical waveguide structure is supplied to an optical bandpass filter to thereby extract components except a small-chirp component from the output optical signal.

By extracting the components except the small-chirp component from the output optical signal in the form of pulse, intensity fluctuations or accumulated noise especially at a top portion and/or a low-power portion of the pulse can be removed. Accordingly, the optical signal can be processed (e.g., clock pulses can be extracted) independently of the bit rate, pulse shape, etc. of the optical signal.

Further, as the optical filter for extracting the components except the small-chirp component, a multipeaked optical filter having a plurality of pass bands, such as an interleave filter and an AOTF (acousto-optic tunable filter) can be used. Accordingly, the present invention is applicable to WDM signal light obtained by wavelength division multiplexing a plurality of optical signals having different wavelengths to effect simultaneous generation of a plurality of clock pulses from one optical signal.

In accordance with a second aspect of the present invention, there is provided a device for processing an optical signal. This device comprises an optical waveguide structure for providing a nonlinear optical effect so that chirp is generated in an optical signal input, and an optical bandpass filter for accepting an output optical signal output from the optical waveguide structure. The optical bandpass filter has a pass band including a wavelength different from the wavelength of the optical signal, and functions to extract components except a small-chirp component from the output optical signal.

In the present invention, an optical fiber for mainly providing normal dispersion may be used as the optical waveguide structure, thereby effectively generating the chirp in the optical signal without degradation in optical S/N ratio.

The optical signal to be input into the optical waveguide structure may be amplified by an optical amplifier such as an EDFA (erbium doped fiber amplifier), so as to effectively generate the chirp in the optical signal.

In accordance with a third aspect of the present invention, there is provided a system for processing an optical signal. This system comprises a first optical fiber transmission line for transmitting an optical signal, an optical repeater for accepting the optical signal transmitted by the first optical fiber transmission line, and a second optical fiber transmission line for transmitting an optical signal output from the optical repeater. The optical repeater may include the device in accordance with the second aspect of the present invention.

In accordance with a fourth aspect of the present invention, there is provided a device for processing an optical signal. This device comprises a device comprising an optical branch for branching an input optical signal into a first optical signal and a second optical signal; a waveform shaper for accepting said first optical signal; a timing recovery circuit for generating a clock pulse according to said second optical signal; and an optical AND circuit for accepting an optical signal output from said waveform shaper and said clock pulse output from said timing recovery circuit. The timing recovery circuit may include the device according to the second aspect of the present invention.

In accordance with a fifth aspect of the present invention, there is provided a method for processing an optical signal. In this method, a clock pulse having a single wavelength is first generated according to input signal light. Then, the clock pulse is supplied to an optical waveguide structure for providing a nonlinear optical effect to broaden the spectrum of the clock pulse. Then, the clock pulse spectrally broadened is supplied to an optical filter having a plurality of pass bands, so that a plurality of clock pulses having a plurality of wavelengths are generated.

In accordance with a sixth aspect of the present invention, there is provided a device for processing an optical signal. This device comprises a clock recovery circuit for generating a clock pulse having a single wavelength according to input signal light; an optical waveguide structure for providing a nonlinear optical effect to broaden the spectrum of said clock pulse supplied; and an optical filter having a plurality of pass bands, for accepting said clock pulse spectrally broadened to generate a plurality of clock pulses having a plurality of wavelengths.

In accordance with a seventh aspect of the present invention, there is provided a device for processing an optical signal. This device comprises an optical branch for branching WDM signal light obtained by wavelength division multiplexing a plurality of optical signals having different wavelengths into first WDM signal light and second WDM signal light; an optical demultiplexer having an input port for inputting said first WDM signal light and a plurality of output ports for outputting a plurality of optical signals having different wavelengths; a multiwavelength clock generator for receiving said second WDM signal light to generate a plurality of clock pulses having a plurality of wavelengths; and a plurality of waveform shapers connected to said plurality of output ports of said optical demultiplexer for performing waveform shaping of said plurality of optical signals according to said plurality of clock pulses. The multiwavelength clock generator may include the device according to the sixth aspect of the present invention.

In accordance with an eighth aspect of the present invention, there is provided a device for processing an optical signal. This device comprises an optical branch for branching WDM signal light obtained by wavelength division multiplexing a plurality of optical signals having different wavelengths into first WDM signal light and second WDM signal light; a first converter for converting said first WDM signal light into a time division multiplexed signal; a multiwavelength clock generator for receiving said second WDM signal light to generate a plurality of clock pulses having a plurality of wavelengths; and a second converter for converting said time division multiplexed signal into WDM signal light according to said plurality of clock pulses. The multiwavelength clock generator may include the device according to the sixth aspect of the present invention.

BRIEF DESCRIPTION OF THE DRAWINGS

FIG. 10 is a block diagram showing a fifth preferred embodiment of the device according to the present invention;

DETAILED DESCRIPTION OF THE PREFERRED EMBODIMENTS

Figure 1A:
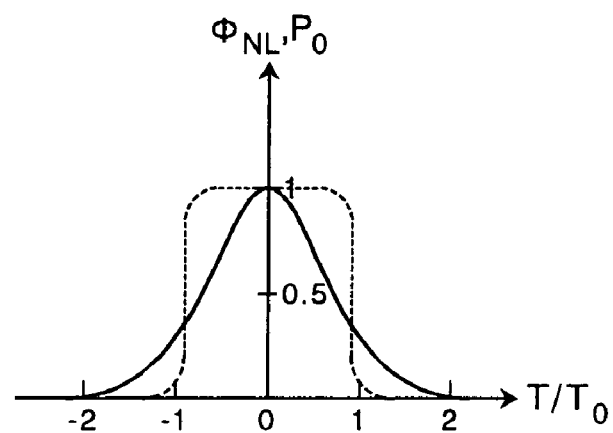
FIGS. 1A and 1B are graphs for illustrating chirp during propagation of a Gaussian pulse and a super-Gaussian pulse in an optical fiber.

Some preferred embodiments of the present invention will now be described in detail with reference to the attached drawings.

Now consider the case that an optical pulse $U(z,T)$ having a width $T_0$ and a peak power $P_0$ propagates in an optical fiber, where T is time in a coordinate system moving with the optical pulse. In the case that the chromatic dispersion $\beta_2$ of this optical fiber is not so large and the dispersion length $L_D = T_0^2/|\beta_2|$ is sufficiently larger than the nonlinear length $L_{NL} = 1/\gamma P_0$ ($\gamma$ is the third-order nonlinear coefficient) to the optical pulse ($L_D \gg L_{NL}$), the phase shift $\phi_{NL}(z,T)$ by SPM (self-phase modulation) is expressed as follows:

$$\phi_{NL}(z, T) = |U(0, T)|^2 \frac{z_{\textit{eff}}}{L_{NL}} \quad (1)$$

where $z_{\textit{eff}} = [1-\exp(-\alpha z)]/\alpha$ is the effective (nonlinear) interaction length.

In this case, the chirp $\delta\omega_{NL}$ is given by the following expression.

$$\delta\omega_{NL} = \frac{\partial \phi_{NL}}{\partial T} = -\frac{\partial |U(0, T)|^2}{\partial T} \frac{z_{\textit{eff}}}{L_{NL}} \quad (2)$$

where $|U(0,T)|^2$ corresponds to the peak power, so that Eq. (2) shows that the chirp of the optical pulse becomes larger at its portion having a larger power slope. Further, the longer the propagated distance z and the shorter the nonlinear length $L_{NL}$ (the larger the value $\gamma P_0$), the larger the chirp. Thus, the chirp induced by SPM gives a new frequency component to the optical pulse, resulting in spectral broadening.

Particularly in the case that the pulse to be used is a short pulse having a width of several picoseconds or less and the peak power is several watts or greater, the chirp $\delta\omega_{NL}$ becomes very large and the pulse becomes light (SC light) having a wide-band spectrum referred to as supercontinuum (SC). The response time of the third-order nonlinear effect in an optical fiber, for example, is on the order of femtoseconds, so that each spectral component of the SC light is substantially completely synchronous with the original input signal pulse. Accordingly, by extracting a part of the SC light by using an optical bandpass filter, one or more pulses synchronous with the input signal pulse can be extracted. This indicates that it is possible to generate a pulse having an arbitrary wavelength in the band of the SC light and synchronous with the input signal light.

Consider the case of inputting an optical pulse of m-th order super-Gaussian type expressed by Eq. (3) as an example into an optical fiber.

$$U(0, T) = \exp\left(-\frac{T^{2m}}{2T_0^{2m}}\right) \quad (3)$$

In this case, the chirp $\delta\omega_{NL}$ is given by the following expression.

$$\delta\omega_{NL} = \frac{2m}{T_0} \frac{z_{\textit{eff}}}{L_{NL}} \left(\frac{T}{T_0}\right)^{2m-1} \exp\left[-\left(\frac{T}{T_0}\right)^{2m}\right] \quad (4)$$

In particular, for a normal Gaussian pulse (m=1), the chirp $\delta\omega_{NL}$ becomes as follows:

$$\delta\omega_{NL} = \frac{2}{T_0} \frac{z_{\textit{eff}}}{L_{NL}} \frac{T}{T_0} \exp\left(-\frac{T^2}{T_0^2}\right) \quad (5)$$

Figure 1B:
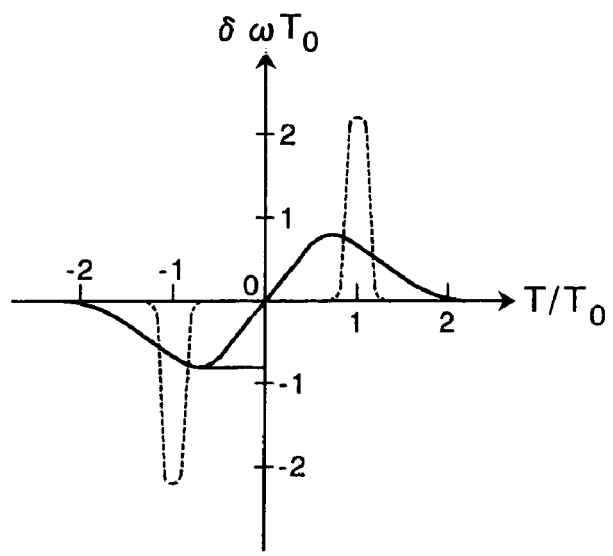

Eqs. (3) to (5) are illustrated in FIGS. 1A and 1B. In FIGS. 1A and 1B, the solid lines show the case of a Gaussian pulse (m=1), and the dashed lines show the case of a super-Gaussian pulse (m=3). The chirp is generated along the slope of the pulse, wherein $\delta\omega<0$ at a leading portion and $\delta\omega>0$ at a trailing portion (up-chirp). Further, in the Gaussian pulse, the chirp is substantially linear near the peak of the pulse.

FIGS. 1A and 1B show that the temporal component of the pulse can be decomposed on the spectrum. The particularly important point is that a portion near the center of the slope where the chirp is large can be distinguished from a portion near the peak and edge portions where the chirp is small. By utilizing this point, minute power fluctuations or accumulated noise near the peak and the edges can be removed by using an optical filter.

That is, the optical pulse is propagated in an optical fiber to forcibly generate SPM and separate the optical pulse into a large-chirp portion and a small-chirp portion in terms of frequency. Thereafter, a spectral component near the small-chirp portion ($\delta\omega\sim0$) is collectively removed by using an optical bandstop filter (BSF).

Such a method of performing all-optical 2R (reamplification and reshaping) regeneration has already been described in Japanese Patent Application No. 2000-34454 (filed Feb. 14, 2000). If the signal pulse is a short pulse having a sufficiently large peak power, SC light is generated by the chirp due to SPM. Also in such SC light, a noise component with a relatively small chirp is concentrated near the center wavelength of the spectrum (the wavelength of the input signal light) as similarly to the above. Accordingly, by extracting a spectral component outside of the band including a large proportion of noise by using an optical bandpass filter, a clock pulse with the noise removed can be regenerated.

To effectively generate the SPM-induced chirp, the use of a dispersion flat fiber (DFF) giving a small normal dispersion independent of a wavelength or the increase of the third-order nonlinear coefficient $\gamma$ of an optical fiber is effective. The DFF can be obtained by suitably controlling a core diameter or a relative refractive-index difference, for example. On the other hand, the third-order nonlinear coefficient $\gamma$ of an optical fiber is expressed as follows:

$$\gamma = \frac{\omega n_2}{c A_{\textit{eff}}} \quad (6)$$

where $\omega$ is the optical angular frequency, c is the velocity of light in a vacuum, and $n_2$ and $A_{\textit{eff}}$ are the nonlinear refractive index and the effective core area of the optical fiber, respectively. The nonlinear coefficient $\gamma$ of a conventional DSF (dispersion shifted fiber) is as small as about 2.6 $W^{-1}km^{-1}$, so a fiber length of several km to 10 km or more is necessary to obtain sufficient chirp. In general, for generation of sufficiently large chirp with a short fiber length, it is effective to increase a light intensity by increasing the nonlinear refractive index $n_2$ in Eq. (6) or by reducing a mode field diameter (MFD) corresponding to the effective core area $A_{\textit{eff}}$ in Eq. (6). The nonlinear refractive index $n_2$ can be increased by doping the cladding with fluorine or the like or by doping the core with a high concentration of $GeO_2$, for example. By doping the core with 25 to 30 mol % of $GeO_2$, a large value of $5 \times 10^{-20}$ m²/W or more (about $n_2 \sim 3.2 \times 10^{-20}$ m²/W for a usual silica fiber) can be obtained as the nonlinear refractive index $n_2$. On the other hand, the MFD can be reduced by designing a relative refractive-index difference $\Delta$ between the core and the cladding or by designing the core shape. For example, by doping the core with 25 to 30 mol % of $GeO_2$ and setting the relative refractive-index difference $\Delta$ to 2.5 to 3.0%, a small value of less than 4 μm can be obtained as the MFD. Owing to the combined effects of increasing the nonlinear refractive index $n_2$ and reducing the MFD, an optical fiber having a large value of 15 $W^{-1}km^{-1}$ or more as the nonlinear coefficient $\gamma$ can be obtained.

Further, to make the dispersion length sufficiently larger than the nonlinear length or to compensate for the chirp, it is desirable that the GVD of such a fiber is arbitrarily adjustable. This point can also be satisfied by setting each parameter in the following manner. That is, in general, a dispersion in a usual DCF increases in a normal dispersion region with an increase in relative refractive-index difference $\Delta$ under the condition that the MFD is set constant. On the other hand, the dispersion decreases with an increase in core diameter, whereas the dispersion increases with a decrease in core diameter. Accordingly, the dispersion can be reduced to zero by increasing the core diameter under the condition that the MFD is set to a certain value in a given wavelength band. Conversely, a desired normal dispersion fiber can also be obtained.

These methods allow realization of a high nonlinear dispersion shifted fiber (HNL-DSF) having a high nonlinear coefficient $\gamma$ of 15 $W^{-1}km^{-1}$ or more or a DCF (dispersion compensating fiber). For example, the fiber having a nonlinear coefficient $\gamma$ of 15 $W^{-1}km^{-1}$ can achieve the same conversion efficiency as that by a usual DSF even when the fiber length is reduced to about 2.6/15~1/5.7 as compared with the usual DSF. As mentioned above, the usual DSF requires a length of about 10 km for sufficient chirp. To the contrary, the HNL-DSF or the DCF as mentioned above can obtain a similar effect with a reduced length of about 1 to 2 km. Practically, loss in the fiber is reduced in an amount corresponding to a decrease in fiber length, so that the fiber can be further shortened to obtain the same efficiency.

Figure 2:
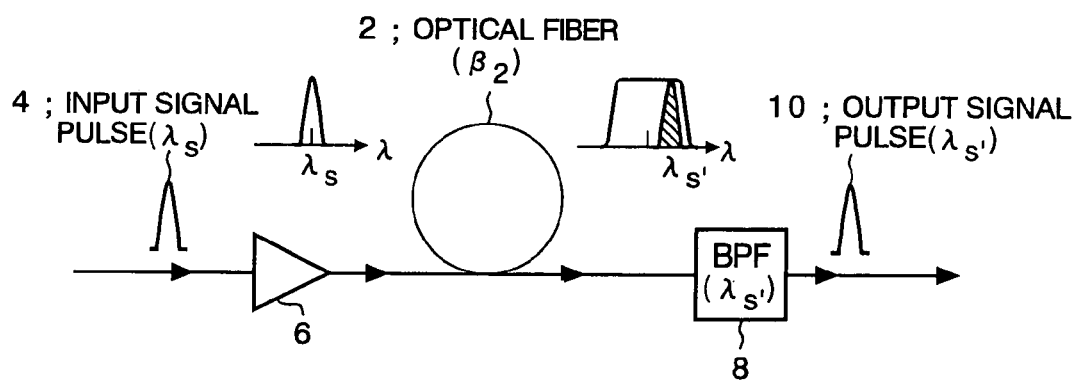
FIG. 2 is a block diagram showing a first preferred embodiment of the device according to the present invention.

FIG. 2 is a block diagram showing a first preferred embodiment of the device according to the present invention. An optical fiber 2 is used as an optical waveguide structure for providing a nonlinear optical effect. The GVD of the optical fiber 2 is $\beta_2$, and the optical fiber 2 gives a normal dispersion and a third-order nonlinear optical effect to an optical signal supplied, for example.

A signal pulse 4 as an optical signal having a center wavelength $\lambda_s$ is amplified by an optical amplifier 6 to obtain a power enough to generate a required chirp. Thereafter, the signal pulse 4 is input into the optical fiber 2. In the optical fiber 2, the chirp is generated by SPM to coherently broaden (diffuse) the spectrum. An output optical signal thus chirped and output from the optical fiber 2 is passed through an optical bandpass filter (BPF) 8 having a pass band whose center wavelength is $\lambda_s'$, thereby extracting components except a small-chirp component and outputting a regenerated pulse 10 having a center wavelength $\lambda_s'$.

The small-chirp component mainly includes fluctuations in off-power (bit 0) component from a zero point (e.g., waveform degradation due to GVD) and a small-slope component near the peak of the pulse. These components determine an optical signal-to-noise ratio (OSNR). Accordingly, by removing these components by the use of a BPF, it is possible to suppress a reduction in OSNR due to the power fluctuations, extinction ratio degradation, noise accumulation, etc. of these components. Accordingly, the present invention allows wavelength conversion and clock pulse extraction accompanied by the improvement in OSNR.

It is preferable to sufficiently space the center wavelength $\lambda_s'$ in the pass band of the BPF 8 from the center wavelength $\lambda_s$ of the signal pulse 4 so that the small-chirp component including noise is not included in the output signal pulse 10. Further, it is preferable to suitably set the width and shape of the pass band of the BPF 8 according to the width and shape of a pulse required. Basically, the width and shape of the pass band of the BPF 8 are set substantially equal to those of the spectrum of the input signal pulse 4.

The degree of chirp will now be estimated to evaluate the possibility of carrying out the present invention. Let us consider the case that a pulse with $T_0=5$ ps propagates in a normal dispersive fiber with $\beta_2=1$ ps²/km and $\gamma=20$ $W^{-1}km^{-1}$. Assuming that the input power of the pulse is $P_0=1$ W, $L_D \gg L_{NL}$ holds because $L_D=25$ km and $L_{NL}=0.05$ km. Accordingly, the influence of dispersion on the chirp is negligible.

In this case, the chirp $\delta\omega$ is 1.68 THz (13 nm) for L=0.5 km. Further, in the case of $P_0=2$ W under similar conditions, the chirp $\delta\omega$ becomes 3.33 THz (26 nm). For a short pulse with 5 to 10 ps, a peak power of about 1 W can be relatively easily realized even at a bit rate of about 40 Gb/s, for example. Therefore, the present invention can be carried out even in consideration of the above-mentioned estimate.

Figure 3:
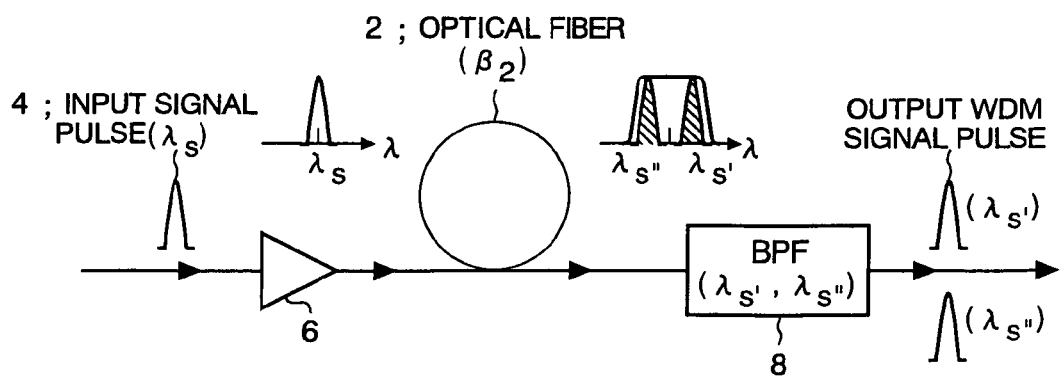
FIG. 3 is a block diagram showing a second preferred embodiment of the device according to the present invention.

FIG. 3 is a block diagram showing a second preferred embodiment of the device according to the present invention. In this preferred embodiment, an optical bandpass filter 8 having a plurality of (e.g., two as shown) pass bands is used. The center wavelengths in the two pass bands are $\lambda_s'$ and $\lambda_s''$. By using such a multipeaked BPF, an output WDM signal pulse including two optical signals respectively having center wavelengths $\lambda_s'$ and $\lambda_s''$ can be obtained. The multipeaked BPF may be selected from an AWG (arrayed waveguide grating), an interleave filter, or fiber gratings connected in tandem, for example.

The principle of noise removal by the present invention will now be described with reference to FIG. 4.

Figure 4:
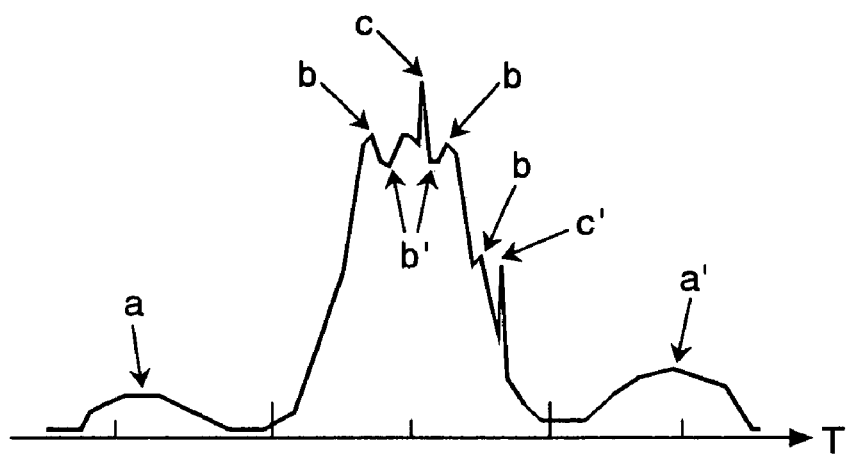
FIG. 4 is a graph for illustrating intensity fluctuations in a pulse which fluctuations are to be removed according to the present invention.

FIG. 4 shows intensity fluctuations in a signal pulse before processing by the present invention. In FIG. 4, the horizontal axis represents time (T). The chirp by SPM at each portion of this pulse will now be considered. Portions shown by a and a' are due to amplified spontaneous emission (ASE) noise in an optical amplifier or waveform distortion by fiber transmission, for example. The portions a and a' should be essentially in zero level, and the intensity at the portions a and a' is low. Accordingly, the chirp at the portions a and a' is small in an optical fiber.

Portions shown by b and b' show fluctuations near the peak of the pulse and on the slope, and they are mainly due to beat noise between the signal pulse and the ASE in an optical amplifier, and waveform distortion by optical fiber transmission, for example. These portions b and b' have a band equal to or slightly wider than the band of the signal, so that the slope is equal to or slightly steeper than the slope of the pulse itself. In this case, the slope is zero at the top and bottom of the intensity fluctuations. Therefore, the chirp near these portions is small.

However, there may exist extremely peaky fluctuation components as shown by c and c'. At such singular points, the chirp is larger than that on the slope of the pulse itself, and the spectrum is located outside of that of a main slope.

Accordingly, the optical pulse extracted by the BPF from a spectral component except the relatively small-chirp components and the extremely large-chirp components as generated at the singular points is suppressed in intensity fluctuations due to noise.

Figure 5:
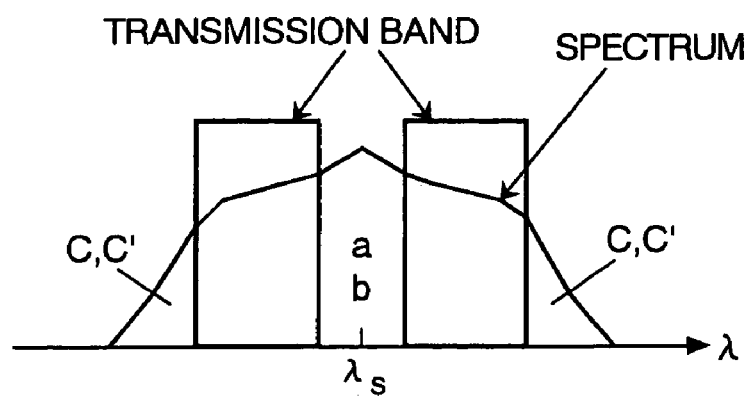
FIG. 5 is a diagram showing the removal of noises by using optical filters in a preferred embodiment of the present invention.

FIG. 5 is a diagram for illustrating a general transmission band (pass band) to be extracted by the present invention. In this example, two transmission bands symmetrical with respect to the center wavelength $\lambda_s$ of a signal spectrum are provided. A stop band between the two transmission bands is provided by an optical bandstop filter, for example, and stop bands outside of the two transmission bands are provided by an optical bandpass filter, for example. Accordingly, the stop band provided by the optical bandstop filter is narrower than the pass band of the optical bandpass filter. The noise component shown by a, a', b, and b' in FIG. 4 can be removed by the stop band between the two transmission bands, and the noise component shown by c and c' in FIG. 4 can be removed by the stop bands outside of the two transmission bands.

As the optical bandstop filter, a narrow-band fiber grating may be used, for example. As the optical bandpass filter, reflection by a fiber grating may be used or a higher-order filter such as a double-cavity type multilayer filter may be used.

While the spectrum shown in FIG. 5 has a largest intensity near the center wavelength, the shape of the spectrum can be made flat by suitably setting the dispersion or the power of the pulse. In the case that the dispersion is set to normal dispersion ($\beta_2>0$), the spectrum shape can be made flat. In an extreme case, the spectrum becomes a superbroad-band white spectrum called supercontinuum (in this case, not only SPM, but also four-wave mixing or the like largely contributes to flattening of the spectrum). By applying the present invention to such a flat chirped spectrum, a constant output independent of input peak power can be obtained, so that the fluctuations near the peak can be effectively suppressed.

Figure 6:
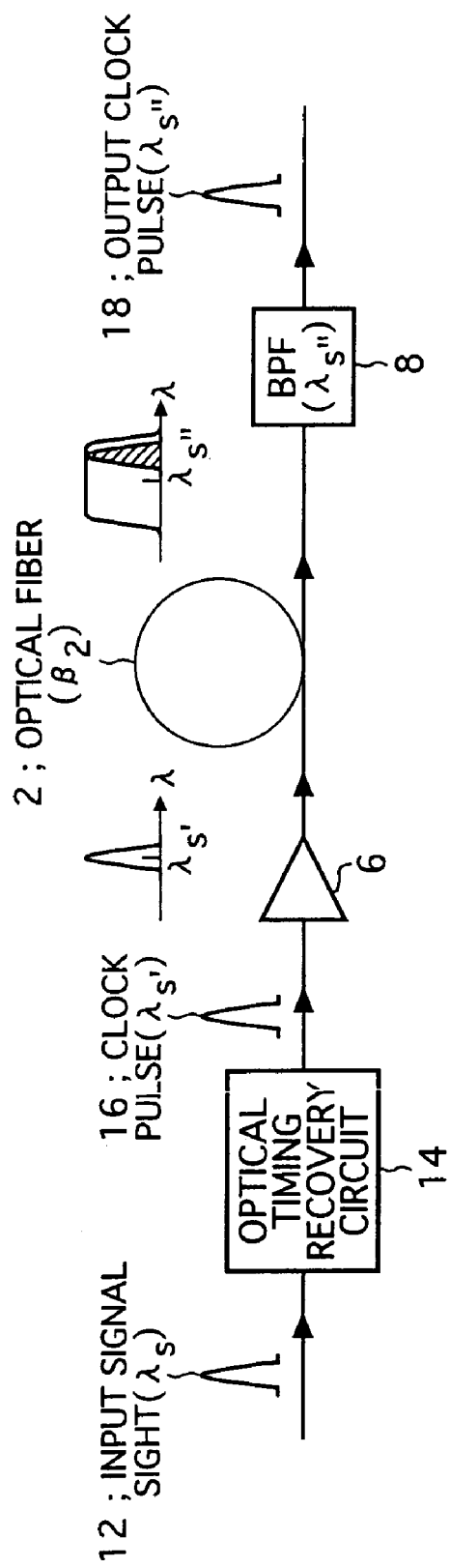
FIG. 6 is a block diagram showing a third preferred embodiment of the device according to the present invention.

FIG. 6 is a block diagram showing a third preferred embodiment of the device according to the present invention. Input signal light 12 having a center wavelength $\lambda_s$ is supplied to an optical timing recovery circuit 14 to extract a clock pulse 16 having a center wavelength $\lambda_s'$. The clock pulse 16 is amplified by an optical amplifier 6 so as to obtain a power enough to generate a required amount of chirp. Thereafter, the clock pulse 16 is input into an optical fiber 2 as an optical waveguide structure for providing a nonlinear optical effect. In the optical fiber 2, chirp due to SPM is generated to broaden the spectrum. An output optical signal thus chirped and output from the optical fiber 2 is passed through an optical bandpass filter 8 having a pass band whose center wavelength is $\lambda_s''$, thereby extracting components except a small-chirp component and outputting an output clock pulse 18 having a center wavelength $\lambda_s''$.

According to this preferred embodiment, even in the case that the clock pulse 16 generated from the optical timing recovery circuit 14 includes various noises and waveform distortion, these can be suppressed to obtain a higher-quality clock pulse. Further, even when the wavelength of the clock pulse 16 generated from the optical timing recovery circuit 14 is different from the wavelength of the original optical signal 12 ($\lambda_s \neq \lambda_s'$), a clock pulse having the same wavelength as that of the original optical signal can be generated by setting the center wavelength in the pass band of the optical bandpass filter 8 so that $\lambda_s''=\lambda_s$. Further, a clock pulse having an arbitrary wavelength can be generated by suitably setting the center wavelength in the pass band of the optical bandpass filter 8.

Figure 7:
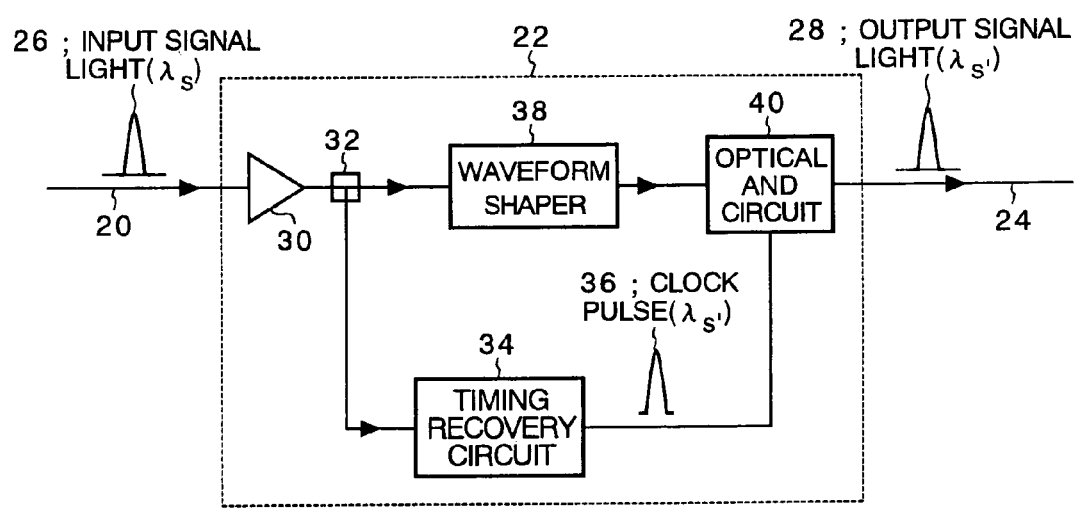
FIG. 7 is a block diagram showing a preferred embodiment of the system according to the present invention.

FIG. 7 is a block diagram showing a preferred embodiment of the system according to the present invention. This system includes a first optical fiber transmission line 20 for transmitting an optical signal, an optical repeater 22 for accepting the optical signal transmitted by the first optical fiber transmission line 20, and a second optical fiber transmission line 24 for transmitting an optical signal output from the optical repeater 22.

The optical signal supplied from the first optical fiber transmission line 20 to the optical repeater 22 is input signal light 26 having a wavelength $\lambda_s$, and the optical signal supplied from the optical repeater 22 to the second optical fiber transmission line 24 is output signal light 28 having a wavelength $\lambda_s'$.

The optical repeater 22 may include the configuration of the device according to the present invention. More specifically, the optical repeater 22 has the following configuration.

The input signal light 26 is amplified by an optical amplifier 30, and thereafter branched into a first optical signal and a second optical signal by an optical branch 32. The first optical signal is input into a waveform shaper 38, and the second optical signal is input into a timing recovery circuit 34 according to the present invention. The timing recovery circuit 34 generates a clock pulse 36 according to the second optical signal. The wavelength of the clock pulse 36 is $\lambda'$. An optical signal output from the waveform shaper 38 and the clock pulse 36 output from the timing recovery circuit 34 are input into an optical AND circuit 40. As a result, the output signal light 28 is output from the optical AND circuit 40. The timing recovery circuit 34 may be provided by the preferred embodiment shown in FIG. 2, for example.

According to this preferred embodiment, the device according to the present invention is applied to the timing recovery circuit 34, so that it is possible to obtain a high-quality clock pulse in which noise and waveform distortion are suppressed, thereby realizing effective 3R regeneration. In the case that an optical gate such as a NOLM (nonlinear optical loop mirror), a Mach-Zehnder interferometer, four wave mixier, etc. is used as the optical AND circuit 40, information owned by an optical signal is transformed to a clock pulse. Accordingly, the wavelength of the output signal light 28 coincides with the wavelength of the clock pulse 36. Further, by using such an optical gate, not only the optical AND operation, but also a waveform shaping effect can be obtained.

While the device according to the present invention is applied to the timing recovery circuit 34 in the preferred embodiment shown in FIG. 7, the device according to the present invention may be applied to the waveform shaper 38.

A single-mode silica fiber (SMF) may be used as each of the optical fiber transmission lines 20 and 24. Examples of the single-mode silica fiber include a 1.3 μm zero-dispersion fiber and a 1.55 μm dispersion shifted fiber (DSF). Each of the optical fiber transmission lines 20 and 24 may be an optical amplification repeatered transmission line including at least one optical amplifier. In this case, attenuation of an optical signal can be compensated by the optical amplifier, thereby allowing long-haul transmission.

In carrying out the present invention, it is preferable to preliminarily compensate for the GVD in a transmission line and the waveform distortion due to the nonlinear effect, so as to effectively generate the chirp. Accordingly, there is a case that each of the optical fiber transmission lines 20 and 24 includes a suitable dispersion compensator or optical phase conjugator, for example, and there is another case that optical soliton transmission is performed by each of the optical fiber transmission lines 20 and 24.

According to the present invention, high-quality timing restoration can be effected. Therefore, in the case that the present invention is applied to a repeater, the S/N ratio on the way of a transmission line can be improved, whereas in the case that the present invention is applied to a receiver, the receiver sensitivity can be improved.

In the prior art, the most general method of generating an optical clock is a method including the steps of once converting input signal light into an electrical signal by an opto/electrical converter, next electrically extracting a clock, and reconverting the clock into an optical signal by a laser. In this method, however, the transmission speed of the input signal light is limited by electrical band limitation. Furthermore, in generating optical clocks having a plurality of wavelengths, it is necessary to provide a plurality of clock generating lasers whose number corresponds to the number of the wavelengths of the optical clocks. Accordingly, the configuration of an optical clock generating device for wavelength division multiplexing becomes large in scale in substantially proportional relationship with the number of the wavelengths. Further, an electrical circuit used in this method depends on the format of the signal light, so that it is hardly flexible to the waveform of the input signal light, for example.

Figure 8:
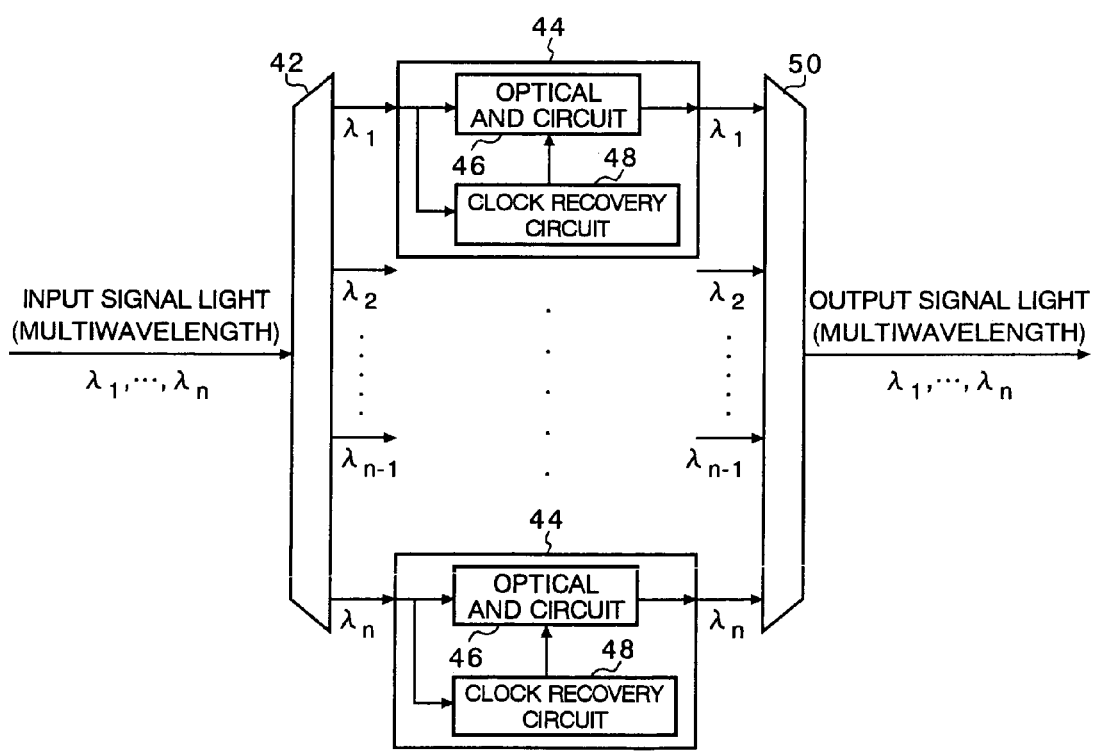
FIG. 8 is a block diagram showing an example of the configuration of a conventional timing adjuster using all-optical clock generators.

On the other hand, according to all-optical type clock generating method such that signal processing is performed on all optical stages, the electrical band limitation can be eliminated. Referring to FIG. 8, there is shown an example of the configuration of a conventional timing adjuster according to the all-optical type clock generating method. WDM signal light (multiwavelength input signal light) obtained by wavelength division multiplexing a plurality of optical signals having different wavelengths $\lambda_1$ to $\lambda_n$ is separated into the optical signals having the wavelengths $\lambda_1$ to $\lambda_n$ by an optical demultiplexer 42. These plural optical signals are supplied to a plurality of timing adjusters 44, respectively. Each timing adjuster 44 includes a clock recovery circuit 48 for extracting a clock according to the input optical signal and an optical AND circuit 46 for accepting the extracted clock and the input optical signal. Timing-adjusted optical signals output from the optical AND circuits 46 of all the timing adjusters 44 are wavelength division multiplexed by an optical multiplexer 50, and resultant WDM signal light (multiwavelength output signal light) is output from the optical multiplexer 50.

According to this conventional device, the electrical band limitation can be eliminated because the all-optical clock generating method is applied. However, it is yet necessary to extract a plurality of optical clocks whose number corresponds to the number of the wavelengths of the input WDM signal light, so that the scale of the device becomes large in substantially proportional relationship with the number of the wavelengths of the WDM signal light.

Thus, an existing optical clock generating device requires an increased number of optical clocks with an increase in number of wavelengths in WDM, and it is expected to provide a method and device which can simultaneously generate multiwavelength clocks.

It is therefore an object of the following preferred embodiments to provide a method of simultaneously generating multiwavelength optical clocks according to signal light having a single wavelength.

According to the present invention to achieve this object, a method for obtaining a plurality of clock pulses is provided. In this method, a clock pulse having a single wavelength is first generated according to input signal light. The clock pulse is next supplied to an optical waveguide structure for providing a nonlinear optical effect to broaden the spectrum of the clock pulse. The clock pulse thus spectrally broadened is next supplied to an optical filter having a plurality of pass bands to generate a plurality of clock pulses having a plurality of wavelengths.

The principle in this method will now be described in detail as focusing on spectral broadening.

The relation between a nonlinear effect $\gamma$ (Kerr effect) producing a phase change proportional to the intensity of signal light and an electric field of an optical pulse propagating in a nonlinear optical waveguide symmetrical with respect to its center and having a chromatic dispersion $\beta_2$ can be described by the following nonlinear Schroedinger equation.

$$i\frac{\partial U}{\partial \xi} - \frac{1}{2}sgn(\beta_2)\frac{\partial^2 U}{\partial \tau^2} = -\frac{L_D}{L_{NL}}|U|^2 U$$

U is the photoelectric field normalized by the peak power of the optical pulse, $\xi$ is the nonlinear optical waveguide length normalized by the dispersion length, $\tau$ is the time normalized by the width $T_0$ of the incident pulse.

The solution of the above nonlinear Schroedinger equation largely differs according to the chromatic dispersion. Accordingly, the spectral broadening will now be described individually in the following three cases, i.e., (a) positive chromatic dispersion (normal dispersive region: $\beta_2>0$), (b) zero chromatic dispersion (zero dispersive region: $\beta_2=0$), and (c) negative chromatic dispersion (anomalous dispersive region: $\beta_2<0$).

(a) Positive chromatic dispersion (normal dispersive region: $\beta_2>0$)

In the normal dispersion region, the Kerr effect as a nonlinear effect is dominant near the incident end of the nonlinear optical waveguide under the condition that the nonlinear effect is large ($L_D \gg L_{NL}$), causing the generation of a nonlinear frequency chirp. This frequency chirp is subsequently linearized by a group velocity dispersion and accumulated. Then, the spectrum is flatly broadened by this accumulated chirp. The value of $L_D/L_{NL}$ defines a spectral broadening rate, and the larger this value, the larger the spectral broadening rate that can be attained.

The details of this principle are available in the literature of "OSA, J. Opt. Soc. Am. B (vol.1, no.2, pp.139–149, 1984)", for example.

(b) Zero chromatic dispersion (zero dispersive region: $\beta_2=0$)

In the case that the chromatic dispersion is zero, the optical signal pulse propagates in the nonlinear optical waveguide without any changes in the pulse waveform, and a nonlinear frequency chirp induced by the nonlinear Kerr effect is accumulated. The amount of this frequency chirp accumulated can be analytically obtained in the case that the incident pulse is of a Gauss type, and is given by the following equation.

$$\Delta\omega = \frac{2z}{L_{NL}}\frac{T}{T_0^2}\exp\left(-\frac{T^2}{T_0^2}\right)$$

where z represents the effective length of the nonlinear optical waveguide. The smaller the nonlinear length (the larger the value γP), the larger the chirp generated and the more the spectrum is therefore broadened. Similarly, it is understood that the larger the effective length z, the more the spectral broadening.

The details of this principle are available in the literature of "Phy. Rev. A, (vol.17, no.4, pp.1448–1453, 1978)", for example.

(c) Negative chromatic dispersion (anomalous dispersive region: $\beta_2 < 0$)

In the anomalous dispersive region, an analytical solution exists. When the optical pulse incident on the nonlinear optical waveguide satisfies $L_D/L_{NL}=1$, a single eigenvalue exists, and its proper solution is given by the following equation.

$$U(\xi, \tau) = \sec h\left(-\frac{T}{T_0}\right)$$

This is referred to as a fundamental optical soliton, which propagates in the nonlinear optical waveguide without any changes in waveform and spectrum. In the case that $L_D/L_{NL}>1$, a plurality of eigenvalues exist, so that the combinations of a plurality of proper solutions are obtained as analytical solutions. These are referred to as higher-order optical solitons. In the anomalous dispersive region, the spectrum can be broadened by the following two methods.

(i) Soliton Adiabatic Compression

The fundamental optical soliton undergoes pulse compression without chirp during propagation in the nonlinear optical waveguide whose chromatic dispersion becomes small. In this pulse compression, the spectrum is broadened. The efficiency of spectral broadening can be obtained as the ratio of a dispersion at the input end of the nonlinear optical waveguide to a dispersion at the output end thereof.

The details of this principle are available in the literature of "OSA, J. Opt. Soc. Am. B (vol.5, no.3, pp.709–713, 1988)", for example.

(ii) Higher-order Soliton Compression

During propagation in the nonlinear optical waveguide, the higher-order optical solitons periodically change with a given period referred to as a soliton length. Pulse compression is necessarily induced by the nonlinear effect near the incident end of the nonlinear optical waveguide, so that the spectrum is broadened. Spectral broadening can be performed by adjusting the nonlinear optical waveguide length to such a length that the spectrum is most broadened.

The details of this principle are available in the literature of "OSA, Opt. Lett. (vol.8, no.5, pp289–291, 1983)", for example.

Figure 9:
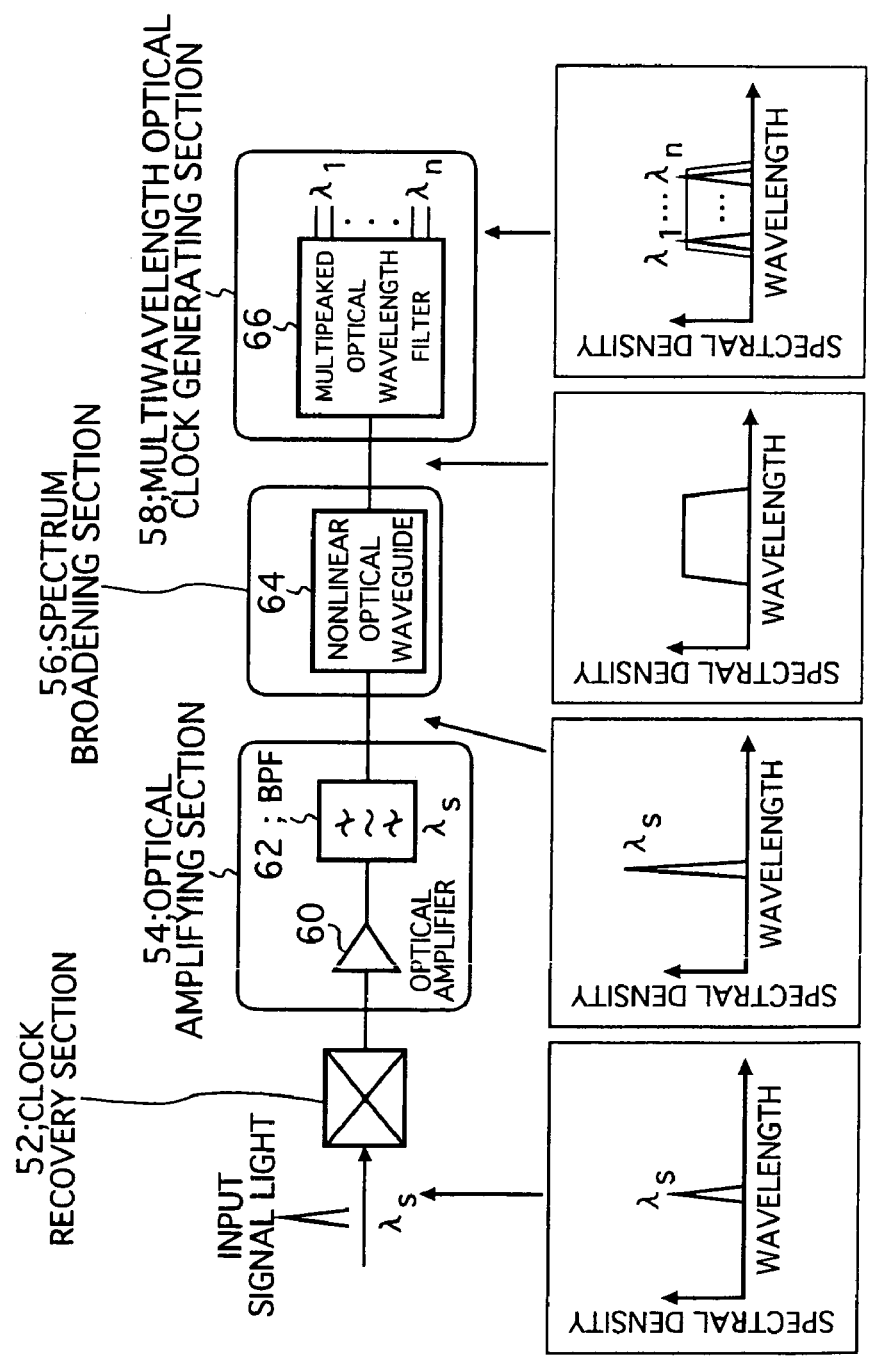
FIG. 9 is a block diagram showing a fourth preferred embodiment of the device according to the present invention.

FIG. 9 is a block diagram showing a fourth preferred embodiment of the device according to the present invention. This device includes a clock recovery section 52, an optical amplifying section 54, a spectrum broadening section 56, and a multiwavelength optical clock generating section 58. The clock recovery section 52 generates a clock pulse having a single wavelength ($\lambda_s$) according to input signal light. The optical amplifying section 54 includes an optical amplifier 60 for amplifying the clock pulse output from the clock recovery section 52 and an optical bandpass filter (BPF) 62 allowing the pass of the clock pulse amplified by the optical amplifier 60. The optical bandpass filter 62 is provided to remove noise added in the optical amplifier 60, and the center wavelength in the pass band of the filter 62 is set to $\lambda_s$.

The clock pulse output from the optical amplifying section 54 is supplied to the spectrum broadening section 56. The spectrum broadening section 56 includes a nonlinear optical waveguide 64 for broadening the spectrum of the clock pulse by a nonlinear optical effect. The nonlinear optical waveguide 64 may be provided by an optical fiber or a semiconductor optical amplifier, for example. In the case that an optical fiber is used as the nonlinear optical waveguide 64, the optical fiber provides any one of normal dispersion, anomalous dispersion, and zero dispersion. In any case, the spectrum of the clock pulse is broadened on the above-mentioned principles.

The clock pulse spectrally broadened above is supplied to the multiwavelength optical clock generating section 58. The clock generating section 58 includes a multipeaked optical wavelength filter 66 having a plurality of pass bands. The center wavelengths in these plural pass bands are $\lambda_1$ to $\lambda_n$. By passing the spectrally broadened clock pulse through the multipeaked optical wavelength filter 66, a plurality of clock pulses having a plurality of wavelengths are generated.

According to this preferred embodiment, a plurality of clock pulses having a plurality of wavelengths can be simultaneously obtained, so that the scale of the device adopting WDM can be reduced.

FIG. 10 is a block diagram showing a fifth preferred embodiment of the device according to the present invention. This preferred embodiment employs a plurality of timing adjusters 68 in place of the timing adjusters 44 in the prior art shown in FIG. 8. Each timing adjuster 68 excludes the clock recovery circuit 48 included in each timing adjuster 44 shown in FIG. 8. Instead, this preferred embodiment employs a multiwavelength clock recovery circuit 70 to which the present invention is applied. The multiwavelength clock recovery circuit 70 is provided by the device shown in FIG. 9, for example.

A part of WDM signal light (wavelengths: $\lambda_1$ to $\lambda_n$) to be supplied to an optical demultiplexer 42 is extracted by an optical coupler 72, and then supplied to an optical bandpass filter 74. The optical bandpass filter 74 allows the pass of an optical signal having an arbitrary wavelength $\lambda_i$ selected from the wavelengths $\lambda_1$ to $\lambda_n$. The optical signal passed through the filter 74 is supplied to the multiwavelength clock recovery circuit 70.

The multiwavelength clock recovery circuit 70 generates a plurality of clock pulses having a plurality of wavelengths $\lambda_1$ to $\lambda_n$ in accordance with the present invention. These clock pulses having the wavelengths $\lambda_1$ to $\lambda_n$ are respectively supplied to the corresponding timing recovery circuits 68. On the other hand, the optical signals having the wavelengths $\lambda_1$ to $\lambda_n$ are supplied from the optical demultiplexer 42 to the corresponding timing recovery circuits 68. In each timing recovery circuit 68, the optical signal from the optical demultiplexer 42 and the clock pulse from the multiwavelength clock recovery circuit 70 are supplied to an optical AND circuit 46 to perform timing adjustment for each optical signal. All the optical signals thus timing-adjusted are wavelength division multiplexed by an optical multiplexer 50, and resultant WDM signal is output from the optical multiplexer 50.

Each of the optical demultiplexer 42 and the optical multiplexer 50 may be provided by an arrayed waveguide grating (AWG), for example. The optical AND circuit 46 may be provided by an optical switch such as a nonlinear loop mirror, a Mach-Zehnder interferometer, four wave mixer, etc.

According to this preferred embodiment, a plurality of clock pulses can be supplied from the single multiwavelength clock recovery circuit 70 even when the number of wavelengths of WDM signal light is increased, so that the device can be simplified in configuration.

Figure 11:
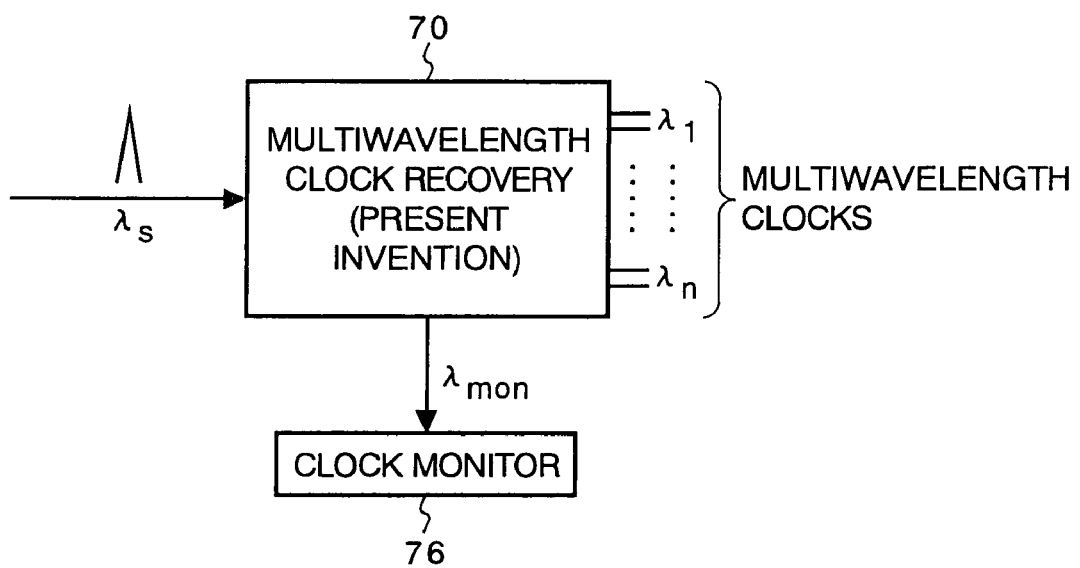
FIG. 11 is a block diagram showing a sixth preferred embodiment of the device according to the present invention.

FIG. 11 is a block diagram showing a sixth preferred embodiment of the device according to the present invention. This device relates to a monitoring method for an optical clock pulse. In the conventional method, a plurality of optical clock pulses generated for the different wavelengths of WDM signal light must be monitored.

In relation to the multiwavelength clock recovery circuit 70 to which the present invention is applied, at least one of the plural clock pulses generated in the multiwavelength clock recovery circuit 70 must be monitored, thereby allowing the detection of the waveforms, spectral shapes, and qualities of all the remaining clock pulses. To this end, this preferred embodiment employs a clock monitoring device 76 connected to the multiwavelength clock recovery circuit 70. The clock monitoring device 76 receives a clock pulse having an arbitrary monitoring wavelength $\lambda_{mon}$ selected from a plurality of wavelengths $\lambda_1$ to $\lambda_n$, and monitors this clock pulse. This monitoring method is allowed for the reason that the spectrum of an extracted clock pulse having a single wavelength is broadened in the present invention, so that duplicates of the clock pulse are generated at all the remaining wavelengths.

Figure 12:
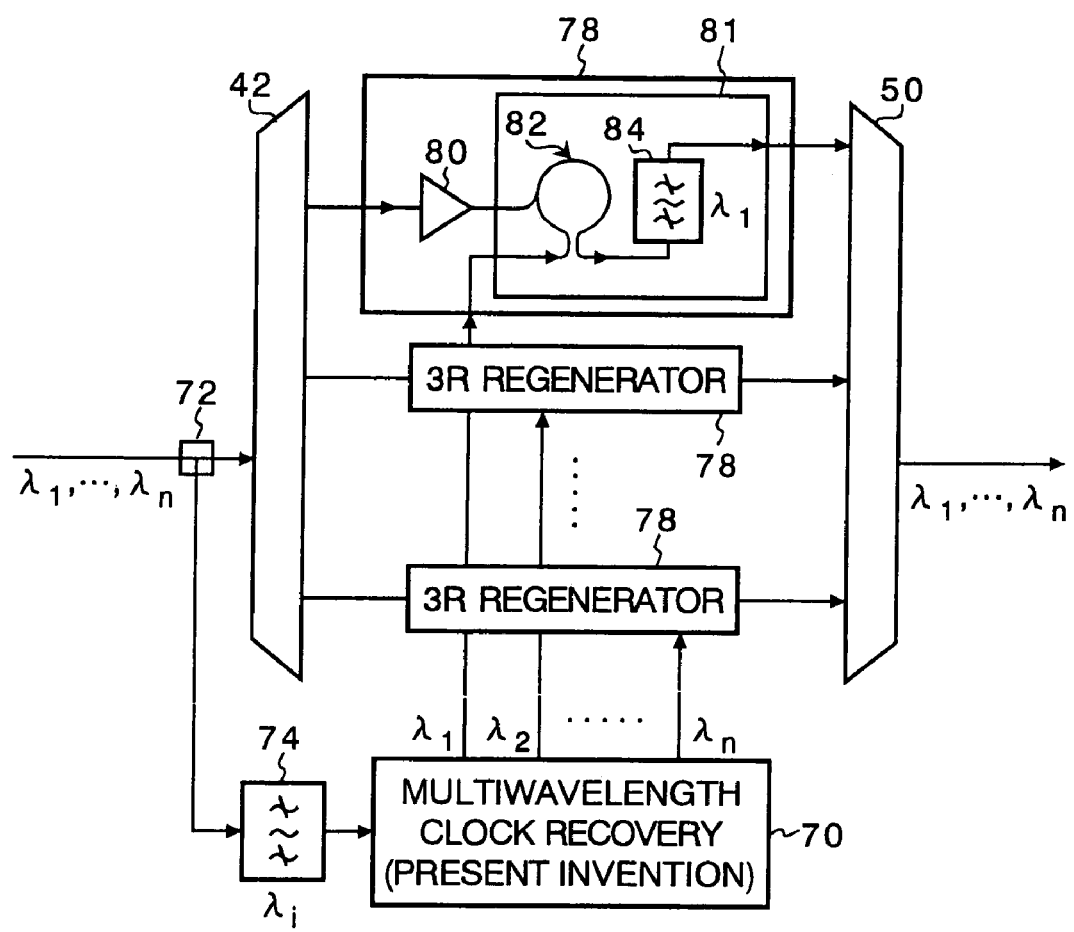
FIG. 12 is a block diagram showing a seventh preferred embodiment of the device according to the present invention.

FIG. 12 is a block diagram showing a seventh preferred embodiment of the device according to the present invention. This preferred embodiment corresponds to a specific example of the preferred embodiment shown in FIG. 10, and employs a plurality of 3R regenerators 78 in place of the plural timing adjusters 68 shown in FIG. 10. Each 3R regenerator 78 includes an optical amplifier 80 for reamplification and a waveform shaper 81 for reshaping and retiming.

The optical amplifiers 80 respectively amplify a plurality of optical signals (wavelengths: $\lambda_1$ to $\lambda_n$) output from an optical demultiplexer 42. Each optical signal amplified is supplied to the corresponding waveform shaper 81. Each waveform shaper 81 includes an optical gate like a nonlinear optical loop mirror (NOLM) 82, for example, for accepting the optical signal from the corresponding optical amplifier 80 and the clock pulse (having the same wavelength as that of the optical signal) from the multiwavelength clock recovery circuit 70, and an optical bandpass filter 84 allowing the pass of an optical signal output from the NOLM 82. The filter 84 has a pass band whose center wavelength coincides with the wavelength of the corresponding optical signal. In the NOLM 82, the waveform of the corresponding optical signal is shaped by its nonlinearity, and the phase noise of the optical signal is removed by the synchronization with the corresponding clock pulse.

The optical signals output from all the 3R regenerators 78 are wavelength division multiplexed by an optical multiplexer 50, and resultant WDM signal light is output from the optical multiplexer 50.

Figure 13:
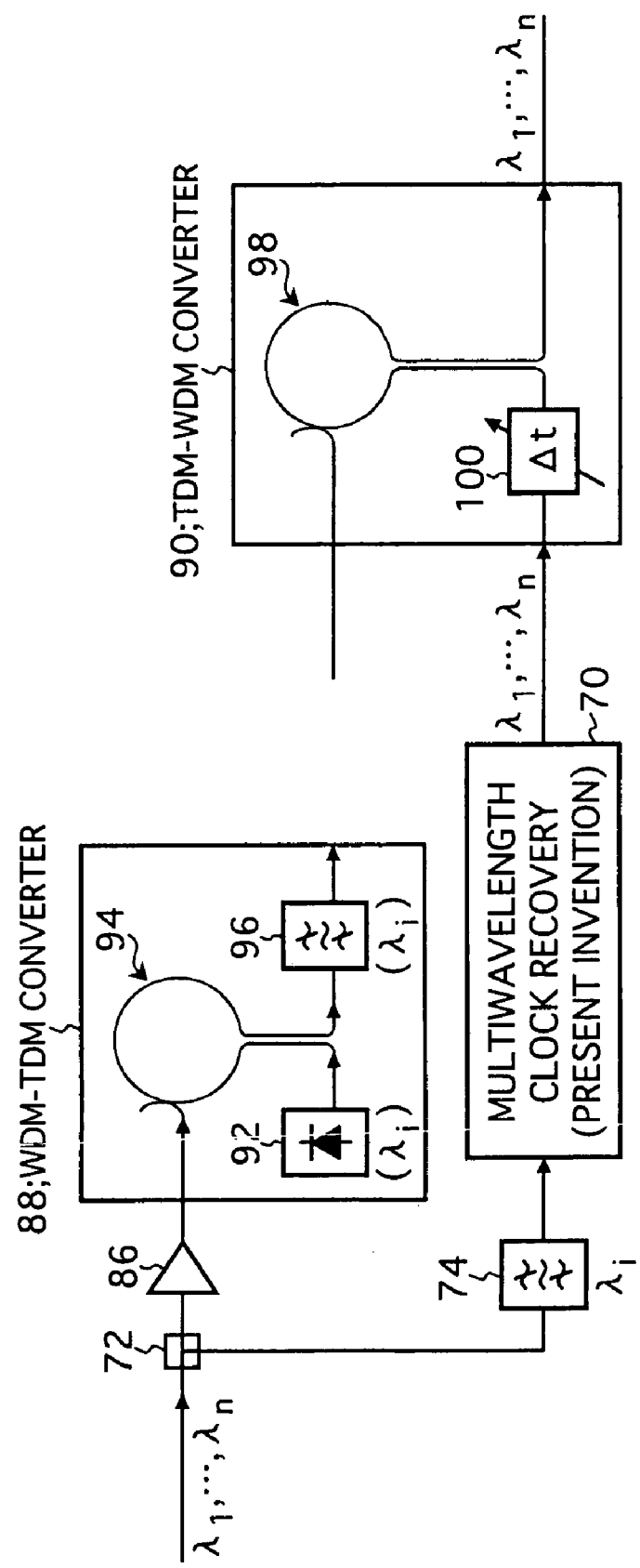
FIG. 13 is a block diagram showing an eighth preferred embodiment of the device according to the present invention.

FIG. 13 is a block diagram showing an eighth preferred embodiment of the device according to the present invention. When WDM signal light obtained by wavelength division multiplexing a plurality of optical signals having different wavelengths $\lambda_1$ to $\lambda_n$ is supplied to this device, the WDM signal light is first separated into first WDM signal light and second WDM signal light by an optical branch 72 such as an optical coupler. The first WDM signal light is amplified by an optical amplifier 86, and then supplied to a WDM-TDM converter 88. The converter 88 converts the supplied WDM signal light into a time division multiplexed signal (TDM signal).

The second WDM signal light from the optical branch 72 is passed through an optical bandpass filter 74 to thereby obtain an optical signal having an arbitrary wavelength $\lambda_i$ selected from the wavelengths $\lambda_1$ to $\lambda_n$. The optical signal is next supplied to a multiwavelength clock recovery circuit 70 to which the present invention is applied. The multiwavelength clock recovery circuit 70 generates a plurality of clock pulses having a plurality of wavelengths $\lambda_1$ to $\lambda_n$ according to the supplied optical signal.

The TDM signal from the WDM-TDM converter 88 and the plural clock pulses from the multiwavelength clock recovery circuit 70 are supplied to a TDM-WDM converter 90. The converter 90 converts the supplied TDM signal into WDM signal light according to the supplied plural clock pulses.

The WDM-TDM converter 88 includes a light source 92 for outputting CW (continuous wave) light having an intermediate wavelength $\lambda$hd i, and an optical gate like a NOLM 94, for example, for accepting the CW light from the light source 92 and the WDM signal light amplified by the optical amplifier 86. By supplying the WDM signal light timely adjusted and the CW light to the NOLM 94, the WDM signal light is converted into a time division multiplexed signal having the intermediate wavelength $\lambda_i$. In this conversion, waveform shaping of the signal is performed by the operation of the NOLM 94. The TDM signal thus obtained is passed through an optical bandpass filter 96 having a pass band whose center wavelength is set to the intermediate wavelength $\lambda_i$, and then output from the converter 88.

The TDM-WDM converter 90 includes an optical gate like a NOLM 98, for example, for accepting the TDM signal from the WDM-TDM converter 88. The NOLM 98 further accepts the plural clock pulses from the multiwavelength clock recovery circuit 70 through a delay circuit 100. The delay circuit 100 operates to shift the timing of the plural clock pulses according to wavelength and to synchronize them with the TDM signal.

By supplying the TDM signal and the plural clock pulses to the NOLM 98, the TDM signal is converted into WDM signal light, and the phase noise of the signal is also removed. The WDM signal light thus obtained is output from this device.

According to this preferred embodiment, a multiwavelength signal can be simultaneously regenerated through no electrical signals by basically using a multiwavelength clock recovery circuit according to the present invention and two optical gates. As a result, the device can be simplified in configuration, and an increase in number of wavelengths can be flexibly supported.

Figure 14:
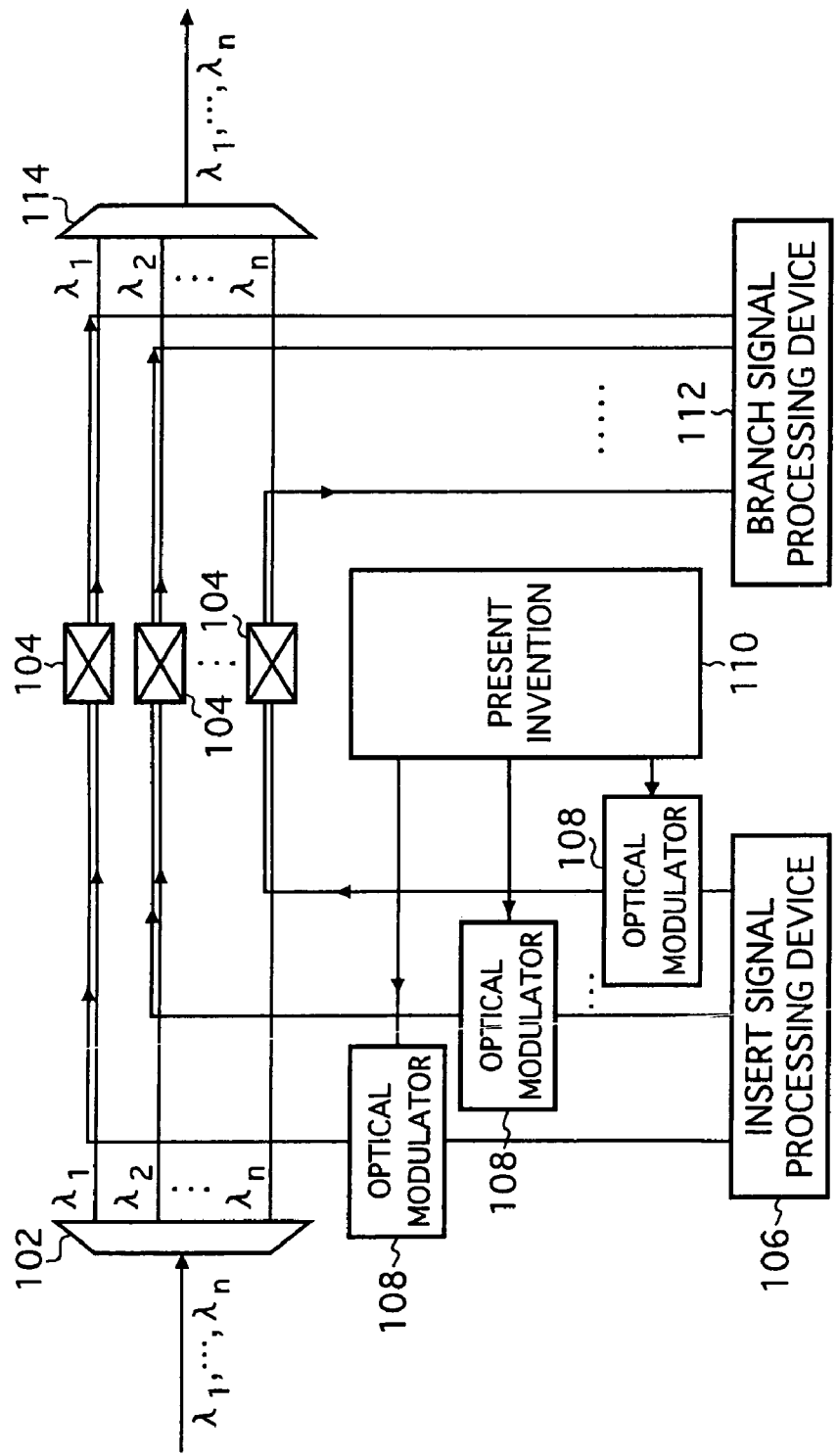
FIG. 14 is a block diagram showing a ninth preferred embodiment of the device according to the present invention.

FIG. 14 is a block diagram showing a ninth preferred embodiment of the device according to the present invention. In this preferred embodiment, a device 110 according to the present invention is used as a multiwavelength light source in an optical add/drop device. More specifically, this preferred embodiment has the following configuration.

WDM signal light supplied to this optical add/drop device is separated into a plurality of optical signals having different wavelengths $\lambda_1$ to $\lambda_n$ by an optical demultiplexer 102, and these plural optical signals are supplied to a plurality of optical switches 104 for optical add/drop, respectively.

An insert signal processing device 106 is provided to supply optical signals to be inserted (insert signals) to the optical switches 104. The optical signals output from the insert signal processing device 106 are supplied to a plurality of optical modulators 108 to operate them. The number of the optical modulators 108 corresponds to the number of wavelengths of the input WDM signal. Clock pulses from the device 110 according to the present invention are supplied to the optical modulators 108, respectively. Optical signals obtained by the operation of the optical modulators 108 by the insert signals are inserted into a transmission line by the optical switches 104.

On the other hand, a branch signal processing device 112 is provided to process optical signals extracted by the optical switches 104. Further, the optical signals output from the optical switches 104 are wavelength division multiplexed by an optical multiplexer 114, and resultant WDM signal light is output from this device.

In a conventional optical add/drop device, a plurality of light sources are required to obtain clock pulses or CW light to be supplied to a plurality of optical modulators. Accordingly, it is difficult to reduce the size of the device. In contrast thereto, the preferred embodiment shown in FIG. 14 has an advantage such that the single device 110 according to the present invention is required to obtain a plurality of clock pulses, thereby allowing a reduction in size and cost of the optical add/drop device and also allowing an improvement in reliability.

Figure 15:
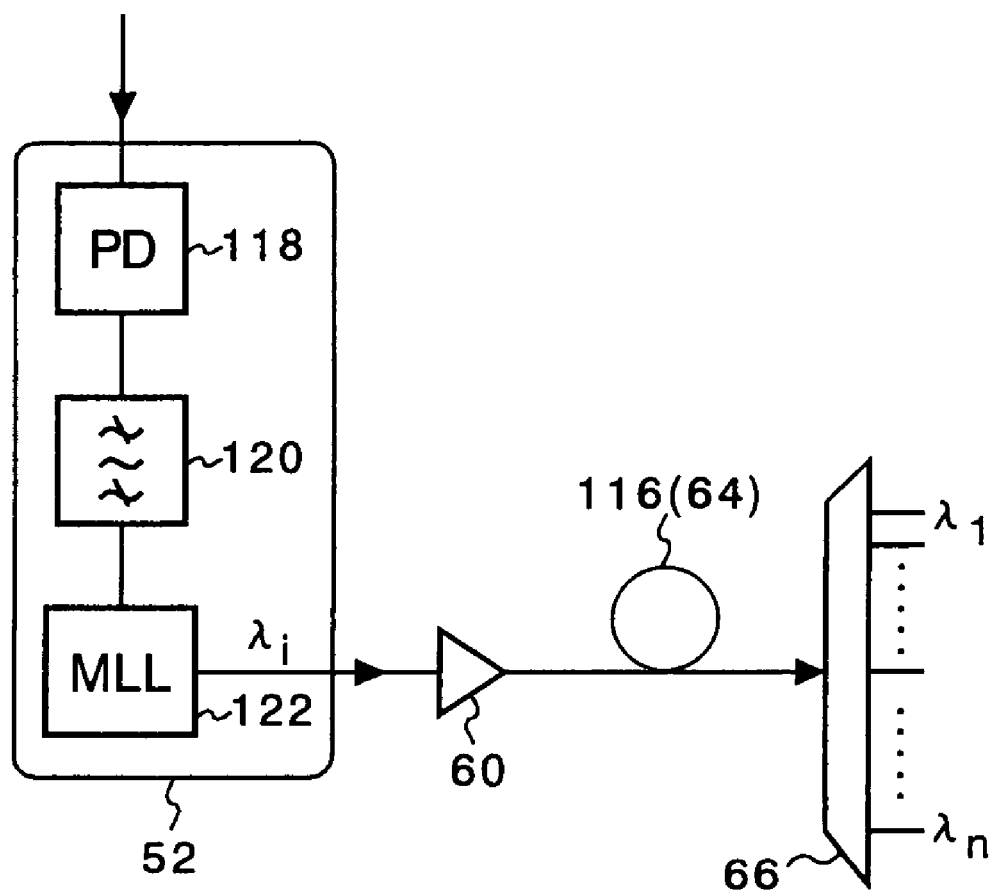
FIG. 15 is a block diagram showing a specific configuration of the device shown in FIG. 9.

FIG. 15 is a block diagram showing a specific configuration of the device shown in FIG. 9. More specifically, an internal configuration of the clock recovery section 52 shown in FIG. 9 is shown, and an optical fiber 116 is used as the nonlinear optical waveguide 64 for spectral broadening. The clock recovery section 52 includes a photodetector (PD) 118, an electrical bandpass filter 120, and a mode-locked laser (MLL) 122. The photodetector 118 receives an optical signal having a single arbitrary wavelength as input signal light and converts this optical signal into an electrical signal. This electrical signal is passed through the bandpass filter 120 to thereby extract a bit rate component of the optical signal and phase noises are reduced. Thus, an electrical signal having a single frequency corresponding to the bit rate can be obtained. The mode-locked laser 122 is modulated by the electrical signal obtained above to obtain an optical clock pulse having a single wavelength $\lambda_i$.

In this preferred embodiment, the optical clock pulse is regenerated by the mode-locked laser 122 according to the electrically extracted bit rate component. Accordingly, a plurality of clearer clock pulses can be generated.

According to the present invention as described above, it is possible to provide a novel method, device, and system for processing of an optical signal independent of the bit rate, pulse shape, etc. of the optical signal. Further, according to the present invention, it is also possible to provide a method, device, and system for processing of an optical signal suitable for WDM (wavelength division multiplexing). The effects obtained by the specific preferred embodiments of the present invention have been described above, so the description thereof will be omitted herein.

What is claimed is:

1. A method comprising:
    inputting an optical signal into an optical waveguide structure for providing a nonlinear effect and broadening a spectrum of said optical signal by said nonlinear effect;
    generating chirp in said optical signal by said nonlinear effect; and
    supplying an output optical signal output from said optical waveguide structure to an optical bandpass filter having a pass band including a wavelength different from the wavelength of said optical signal to extract components except a component in which said chirp is small from said output optical signal, wherein
    said optical bandpass filter has a plurality of pass bands that are separate each other, and are multi-peaked and located at longer and shorter sides for a predetermined wavelength distant from center wavelength of said output optical signal; and a band at longer and shorter wavelength sides near said center wavelength is not included in said pass bands.

2. A method according to claim 1, wherein said optical waveguide structure comprises an optical fiber for providing normal dispersion.

3. A method according to claim 1, wherein said optical waveguide structure comprises a dispersion flattened fiber having a dispersion independent of wavelength.

4. A method according to claim 1, further comprising the optically amplifying said optical signal to be input into said optical waveguide structure so that a required amount of chirp is obtained.

5. A method according to claim 1, wherein said optical signal comprises a clock pulse extracted by an optical timing recovery circuit.

6. A method according to claim 1, wherein said optical bandpass filter has a plurality of pass bands.

7. A device comprising:
    an optical waveguide structure for providing a nonlinear optical effect so that chirp is generated in an optical signal input and a spectrum of said optical signal by said nonlinear effect is broadened; and
    an optical bandpass filter for accepting an output optical signal output from said optical waveguide structure to extract components except a component in which said chirp is small from said output optical signal; wherein
    said optical bandpass filter has a plurality of pass bands that are separate each other, and are multi-peaked and located at longer and shorter wavelength sides for a predetermined wavelength distant from center wavelength of said output optical signal, and a band at longer and shorter wavelength sides near said center wavelength is not included in said pass bands.

8. A device according to claim 7, wherein said optical waveguide structure comprises an optical fiber for providing normal dispersion.

9. A device according to claim 7, wherein said optical waveguide structure comprises a dispersion flattened fiber having a dispersion independent of wavelength.

10. A device according to claim 7, further comprising an optical amplifier for optically amplifying said optical signal to be input into said optical waveguide structure so that a required amount of chirp is obtained.

11. A device according to claim 7, further comprising an optical timing recovery circuit for extracting a clock pulse as said optical signal.

12. A device according to claim 7, wherein said optical bandpass filter has a plurality of pass bands.

13. A system comprising:
    a first optical fiber transmission line for transmitting an optical signal;
    an optical repeater for accepting said optical signal transmitted by said first optical fiber transmission line; and
    a second optical fiber transmission line for transmitting an optical signal output from said optical repeater;
    said optical repeater comprising:
    an optical waveguide structure for providing a nonlinear optical effect so that chirp is generated in said optical signal input and a spectrum of said optical signal by said nonlinear effect is broadened; and an optical bandpass filter for accepting an output optical signal output from said optical waveguide structure to extract components except a component in which said chirp is small from said output optical signal; wherein said optical bandpass filter has a plurality of pass bands that are separate from each other, and are multi-peaked and located at longer and shorter wavelength sides for a predetermined wavelength distant from center wavelength of said output optical signal; and band at longer and shorter wavelength sides near said center wavelength is not included in said pass bands.

14. A device comprising:

an optical branch for branching an input optical signal into a first optical signal and a second optical signal;

a waveform shaper for accepting said first optical signal;

a timing recovery circuit for generating a clock pulse according to said second optical signal; and an optical AND circuit for accepting an optical signal output from said waveform shaper and said clock pulse output from said timing recovery circuit;

said timing recovery circuit comprising:

an optical waveguide structure for providing a nonlinear optical effect so that chirp is generated in said second optical signal input and a spectrum of said optical signal by said nonlinear effect is broadened; and an optical bandpass filter for accepting an output optical signal output from said optical waveguide structure to extract components except a component in which said chirp is small from said output optical signal; wherein said optical bandpass filter has a plurality of pass bands which are separate each other, and are multi-peaked and located at longer and shorter wavelength sides for a predetermined wavelength distant from center wavelength of said output optical signal; and band at longer and shorter wavelength sides near said center wavelength is not included in said pass bands.

15. A device according to claim 14, wherein said waveform shaper comprises:

an optical waveguide structure for providing a nonlinear optical effect so that chirp is generated in said first optical signal input; and an optical bandpass filter for accepting an output optical signal output from said optical waveguide structure to extract components except a component in which said chirp is small from said output optical signal;

said optical bandpass filter having a pass band including a wavelength different from the wavelength of said optical signal.

* * * * *

UNITED STATES PATENT AND TRADEMARK OFFICE
CERTIFICATE OF CORRECTION

| | |
|---|---|
| PATENT NO. | : 7,076,174 B2 |
| APPLICATION NO. | : 09/814762 |
| DATED | : July 11, 2006 |
| INVENTOR(S) | : Shigeki Watanabe et al. |

It is certified that error appears in the above-identified patent and that said Letters Patent is hereby corrected as shown below:

On the title Page, Item [56] Column 2 (Other Publications), Line 2, change "Soc" to --Soc.--.

Column 18, Line 6, after "separate" insert --from--.

Column 18, Line 37, after "separate" insert --from--.

Column 20, Line 7, after "separate" insert --from--.

Signed and Sealed this

Thirtieth Day of January, 2007

JON W. DUDAS
*Director of the United States Patent and Trademark Office*